(12) United States Patent
Katsurada et al.

(10) Patent No.: US 11,342,870 B2
(45) Date of Patent: May 24, 2022

(54) POWER GENERATION CONTROLLER FOR VEHICLE AC POWER GENERATOR

(71) Applicant: Mitsubishi Electric Corporation, Tokyo (JP)

(72) Inventors: Keisuke Katsurada, Tokyo (JP); Akio Kamimurai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/970,012

(22) PCT Filed: May 15, 2018

(86) PCT No.: PCT/JP2018/018700
§ 371 (c)(1),
(2) Date: Aug. 14, 2020

(87) PCT Pub. No.: WO2019/220526
PCT Pub. Date: Nov. 21, 2019

(65) Prior Publication Data
US 2021/0104962 A1    Apr. 8, 2021

(51) Int. Cl.
*H02P 9/00*    (2006.01)
*H02P 9/02*    (2006.01)

(52) U.S. Cl.
CPC ............... *H02P 9/006* (2013.01); *H02P 9/02* (2013.01)

(58) Field of Classification Search
CPC .................................. H02P 9/006; H02P 9/02
See application file for complete search history.

(56) References Cited

U.S. PATENT DOCUMENTS

| | | | |
|---|---|---|---|
| 2005/0133285 A1 | 6/2005 | Shimizu | |
| 2006/0197346 A1* | 9/2006 | Maehara | F02D 41/083 290/40 B |
| 2007/0227499 A1 | 10/2007 | Asada et al. | |

FOREIGN PATENT DOCUMENTS

| | | | |
|---|---|---|---|
| EP | 1 544 018 A2 | 6/2005 | |
| JP | 05-336682 A | 12/1993 | |
| JP | 3283325 B2 | 5/2002 | |
| JP | 2006-246574 A | 9/2006 | |
| JP | 4179296 B2 | 11/2008 | |
| JP | 2009225557 A * | 10/2009 | ............... H02P 9/14 |
| JP | 2015-065788 A | 4/2015 | |

OTHER PUBLICATIONS

International Search Report for PCT/JP2018/018700, dated Aug. 21, 2018.
Extended European Search Report dated Mar. 9, 2021 in European Application No. 18918760.2.
Communication dated Oct. 26, 2021 from the Japanese Patent Office in Application No. 2020-518845.

* cited by examiner

*Primary Examiner* — Julio G. Gonzalez
(74) *Attorney, Agent, or Firm* — Sughrue Mion, PLLC; Richard C. Turner

(57) ABSTRACT

When a state where a power-generation voltage of a vehicle AC power generator is the same as or lower than a predetermined voltage has continued for a predetermined time or longer, a power generation controller stops or disables a low-voltage protection circuit from performing its operation so that an unintentional voltage rise caused by the low-voltage protection circuit is prevented.

20 Claims, 6 Drawing Sheets

POWER GENERATION CONTROLLER FOR VEHICLE AC POWER GENERATOR

CROSS REFERENCE TO RELATED APPLICATIONS

This application is a National Stage of International Application No. PCT/JP2018/018700 filed May 15, 2018.

TECHNICAL FIELD

The present application relates to a power generation controller for a vehicle AC power generator to be mounted in a vehicle such as an automobile.

BACKGROUND ART

As is well known, a power generation controller for a vehicle AC power generator to be mounted in a vehicle such as an automobile is formed of a semiconductor integrated circuit provided with a circuit for monitoring, for example, an output terminal voltage of the power generator or a battery voltage in order to adjust a field current to be supplied to a field coil so that the output terminal voltage becomes a target setting voltage. In a power generation controller for a vehicle AC power generator, when in an overvoltage state where the power-generation voltage of the AC power generator main body becomes higher than a predetermined voltage, there exists a probability that the vehicle AC power generator fails and hence the vehicle becomes unable to travel. In particular, in some cases, the overvoltage state may become a cause of firing; thus, it is preferentially required to avoid this state.

In contrast, in a low-voltage state where the power-generation voltage of the vehicle AC power generator becomes lower than a predetermined voltage, an electric apparatus that operates with a battery voltage as a power source becomes inoperative; thus, there exists a probability that unintended operation occurs, for example, the vehicle becomes unable to travel.

A filter for removing a ripple that occurs in the output terminal voltage, to be monitored, of the AC power generator main body is mounted in a voltage control unit that is in the power generation controller for the vehicle AC power generator and is to control the power-generation voltage. The filter is formed of a lowpass filter for removing a high-frequency ripple. However, because the lowpass filter is provided in the voltage control unit, power-generation control by the voltage control unit cannot cope with an instantaneous voltage fall in the output terminal voltage or the battery voltage.

Moreover, due to the existence of the foregoing lowpass filter, the responsiveness of the power-generation control by the power generation controller is low; thus, there exists a probability that when the battery is deteriorated or when the battery is opened while the vehicle AC power generator is operated, an undershoot occurs in the power-generation voltage of the AC power generator main body and hence the power-source voltage for an electric apparatus connected with the vehicle AC power generator also falls.

To date, there has been proposed a technology (e.g., refer to Patent Document 2) in which when the battery voltage has not abnormally fallen, the power-generation amount of the AC power generator main body is controlled not with a normal duty ratio for controlling the power-generation voltage of the AC power generator main body, which is determined by a voltage adjustment apparatus, but with a maximum allowable duty ratio for providing a maximum allowable power-generation amount without making the engine rotation speed largely fluctuate.

Moreover, to date, it has been proposed to provide a low-voltage protection circuit with which a power generation controller operates in such a way as to forcibly supply a field current to a field coil so as to raise a power-generation voltage, when the power-generation voltage of an AC power generator becomes the same as or lower than a predetermined voltage (e.g., refer to Patent Document 1).

PRIOR ART REFERENCE

Patent Document

[Patent Document 1] Japanese Patent No. 4179296 (JP4179296B2)
[Patent Document 2] Japanese Patent No. 3283325 (JP3283325B2)

DISCLOSURE OF THE INVENTION

Problems to be Solved by the Invention

In the case of the conventional apparatus disclosed in the foregoing Patent Document 1, in a low-voltage state where the power-generation voltage of the AC power generator main body becomes lower than a predetermined voltage, the low-voltage protection circuit forcibly supplies a field current to the field coil, regardless of a function for adjusting the power-generation voltage, so as to raise the power-generation voltage. Accordingly, in a power generation controller having a low-voltage protection function, there has been a problem that when a low-voltage state is erroneously detected due to a failure in the power generation controller or the like, the power-generation voltage of the AC power generator main body unintentionally rises and an overvoltage state occurs.

The present application has been implemented in order to solve the foregoing problem; the objective thereof is to obtain a power generation controller, for a vehicle AC power generator, that is superior in the safety and with which neither the power-generation voltage of the AC power generator main body unintentionally rises nor an overvoltage state occurs, even when a low-voltage state is erroneously detected due to a failure therein or the like.

Means for Solving the Problems

A power generation controller for a vehicle AC power generator disclosed in the present application is characterized by including
 a voltage control circuit that controls a power-generation voltage of an AC power generator main body by controlling a field current flowing in a field coil of the AC power generator main body to be mounted in a vehicle,
 a low-voltage protection circuit that performs operation of increasing the field current so as to raise the power-generation voltage, regardless of control of the power-generation voltage by the voltage control circuit, when the power-generation voltage or a voltage based on the power-generation voltage becomes lower than a predetermined voltage, and
 a low-voltage-protection continuous operation prevention circuit that stops the low-voltage protection circuit from performing the operation, when the operation performed by the low-voltage protection circuit has continued for a time exceeding a predetermined time.

Advantage of the Invention

A power generation controller for a vehicle AC power generator disclosed in the present application includes
a low-voltage protection circuit that performs operation of increasing the field current so as to raise the power-generation voltage, regardless of control of the power-generation voltage by the voltage control circuit, when the power-generation voltage or a voltage based on the power-generation voltage becomes lower than a predetermined voltage, and
a low-voltage-protection continuous operation prevention circuit that stops the low-voltage protection circuit from performing the operation, when the operation performed by the low-voltage protection circuit has continued for a time exceeding a predetermined time.

As a result, there can be obtained a power generation controller, for a vehicle AC power generator, that is superior in the safety and with which neither the power-generation voltage unintentionally rises nor an overvoltage state occurs, even when a low-voltage state is erroneously detected due to a failure therein or the like.

BEST MODE FOR CARRYING OUT THE INVENTION

Embodiment 1

Figure 1:
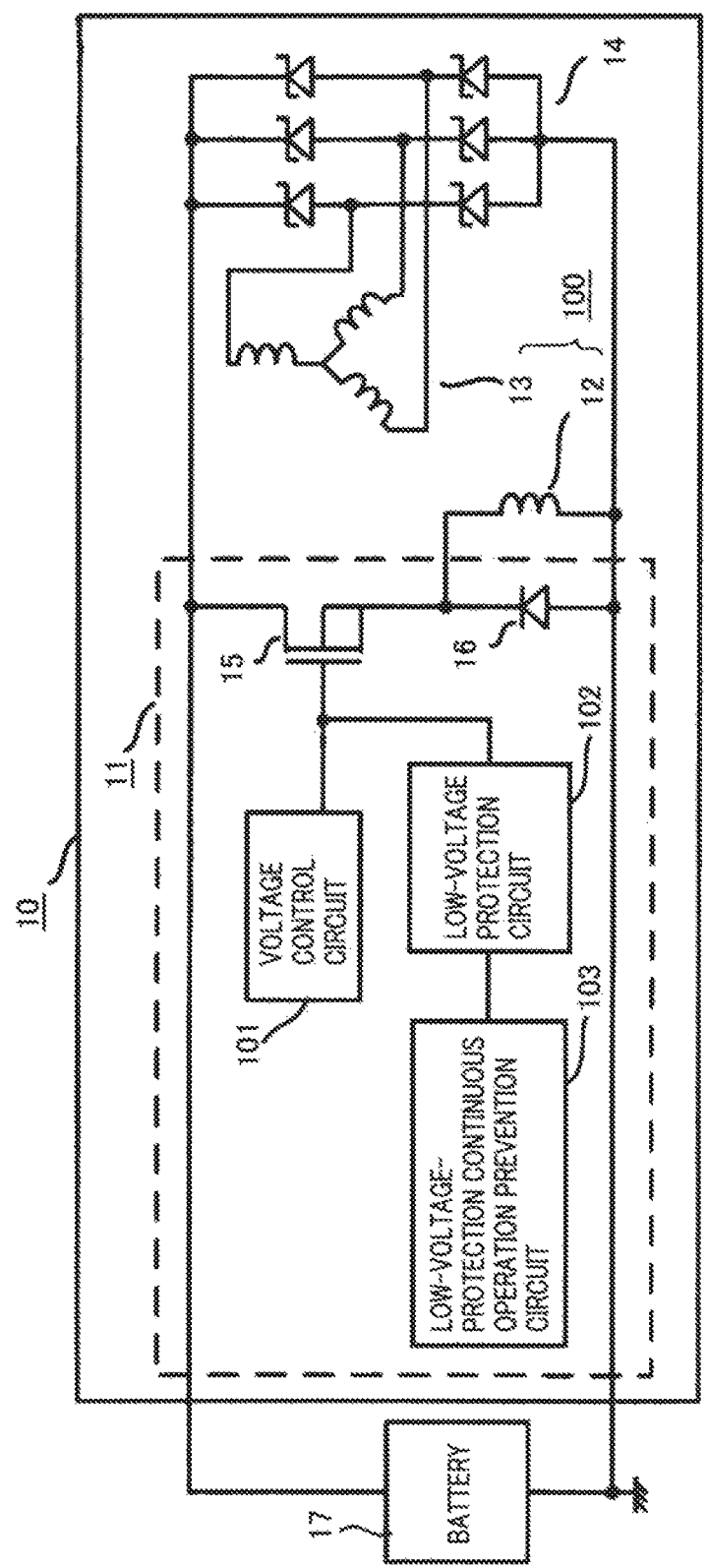
FIG. 1 is a configuration diagram representing a power generation controller for a vehicle AC power generator according to Embodiment 1.

FIG. 1 is a configuration diagram representing a power generation controller for a vehicle AC power generator according to Embodiment 1. In FIG. 1, a vehicle AC power generator 10 to be mounted in a vehicle such as an automobile includes an AC power generator main body 100 having an armature coil 13 provided in a stator and a field coil 12 provided in a rotor, a rectifier 14 for rectifying a three-phase AC voltage, outputted by the armature coil 13, into a DC voltage, and a power generation controller 11 for a vehicle AC power generator according to Embodiment 1.

The power generation controller 11 includes a recirculation diode 16 connected in parallel with the field coil 12, a transistor 15 as a switching device, a voltage control circuit 101, a low-voltage protection circuit 102, and a low-voltage-protection continuous operation prevention circuit 103. The voltage control circuit 101, the low-voltage protection circuit 102, and the low-voltage-protection continuous operation prevention circuit 103 operate by being supplied with electric power by an internal power source (unillustrated) provided in the power generation controller 11.

Figure 6:
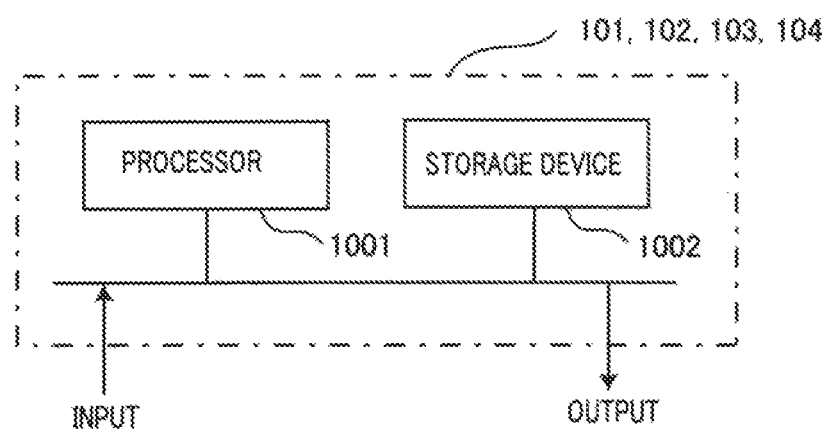
FIG. 6 is an explanatory diagram representing part of hardware configurations in the power generation controller for a vehicle AC power generator according to each of Embodiments 1 through 4.

As an example of hardware represented in FIG. 6, each of the voltage control circuit 101, the low-voltage protection circuit 102, and the low-voltage-protection continuous operation prevention circuit 103 is formed of a processor 1001 and a storage device 1002. Although not illustrated, the storage device has a volatile storage device such as a random access memory and a nonvolatile auxiliary storage device such as a flash memory. Instead of the flash memory, an auxiliary storage device formed of a hard disk may be provided. The processor 1001 implements a program inputted from the storage device 1002. In this case, the program is inputted from the auxiliary storage device to the processor 1001 by way of the volatile storage device. It may be allowed that the processor 1001 either outputs data such as a calculation result to the volatile storage device in the storage device 1002 or stores the data in the auxiliary storage device by way of the volatile storage device.

The transistor 15 is connected in series with a parallel connection member consisting of the recirculation diode 16 and the field coil 12. The voltage control circuit 101 controls a field current flowing in the field coil 12 by performing switching control of the transistor 15 so that the power-generation voltage generated by the AC power generator main body 100 becomes equal to a target setting voltage.

The power-generation voltage, as a three-phase AC voltage, that is induced in the armature coil 13 of the AC power generator main body 100 is full-wave rectified so as to be converted into a DC voltage by the rectifier 14 and is supplied to a battery 17 mounted in a vehicle. The battery voltage, as a terminal voltage of the battery 17, is the same as or in proportion to the power-generation voltage of the AC power generator main body 100.

When detecting that the power-generation voltage of the AC power generator main body 100 is lower than a predetermined voltage, the low-voltage protection circuit 102 turns on the transistor 15 through an after-mentioned predetermined routine, regardless of switching control of the transistor 15 by the voltage control circuit 101, so that a field current flowing in the field coil 12 is forcibly increased and hence the power-generation voltage of the AC power generator main body 100 is raised. In the present embodiment, as a means for detecting that the power-generation voltage of the AC power generator main body 100 is lower than a predetermined voltage, it is detected, as described later, that the battery voltage is lower than a predetermined voltage VBL; however, it may be allowed that the power-generation voltage of the AC power generator main body 100 is directly detected and then it is detected that the power-generation voltage is lower than a predetermined voltage.

As described later, when the operation by the low-voltage protection circuit 102 has continued for a time longer than a predetermined time, the low-voltage-protection continuous operation prevention circuit 103 stops the low-voltage protection circuit 102 from performing the foregoing operation.

In a normal operation of the vehicle AC power generator 10, the power generation controller 11 performs feedback control of a feedback-control flowing in the field coil 12 in such a way the power-generation voltage of the AC power generator main body 100 coincides with a target setting voltage to be provided from the outside. For example, the voltage control circuit 101 generates a driving signal having a duty ratio corresponding to a difference between the target setting voltage to be provided from the outside and the power-generation voltage of the AC power generator main body 100, and then provides the driving signal to the gate of the transistor 15 so as to perform PWM (Pulse Width Modulation)-control of the transistor 15.

When the transistor 15 is turned on, a field current is applied from the battery 17, as a DC power source, to the field coil 12, so that the power-generation voltage of the AC power generator main body 100 rises; when the transistor 15 is turned off, the field current that has been flowing in the field coil 12 recirculates and decreases through the recirculation diode 16, so that the power-generation voltage of the AC power generator main body 100 falls. Accordingly, when the transistor 15 is PWM-controlled in such a way that the difference between the target setting voltage to be provided from the outside and the power-generation voltage of the AC power generator main body 100 becomes "0", the power-generation voltage of the AC power generator main body 100 is controlled in such a way as to coincide with the target setting voltage to be provided from the outside.

Next, there will be explained the operation by the power generation controller 11 at a time when the power-generation voltage of the AC power generator main body 100 falls for some reason. When detecting that the power-generation voltage of the AC power generator main body 100 falls to be lower than the predetermined voltage VBL, the low-voltage protection circuit 102 turns on the transistor 15, regardless of switching control of the transistor 15 by the voltage control circuit 101, so as to perform the operation in which a field current is increased and the power-generation voltage of the AC power generator main body 100 is raised. When the power-generation voltage of the AC power generator main body 100 rises up to the predetermined voltage VBL or higher, the operation by the low-voltage protection circuit 102 stops, so that the voltage control circuit 101 controls the transistor 15 in a normal manner.

The low-voltage protection circuit 102 performs the foregoing operation so as to raise the power-generation voltage of the AC power generator main body 100; however, when due to a failure in a circuit for detecting the battery voltage, the low-voltage protection circuit 102 operates even when the battery voltage is the same as or higher than the foregoing predetermined voltage VBL, the power-generation voltage of the AC power generator main body 100 unintentionally rises and hence an overvoltage state occurs.

Accordingly, in order to prevent the power-generation voltage of the AC power generator main body 100 from becoming an overvoltage, the low-voltage-protection continuous operation prevention circuit 103 detects that the low-voltage protection circuit 102 has continued the foregoing operation of raising the power-generation voltage of the AC power generator main body 100 for a time longer than a predetermined time TVBL, and then stops the low-voltage protection circuit 102 from operating.

Figure 2:
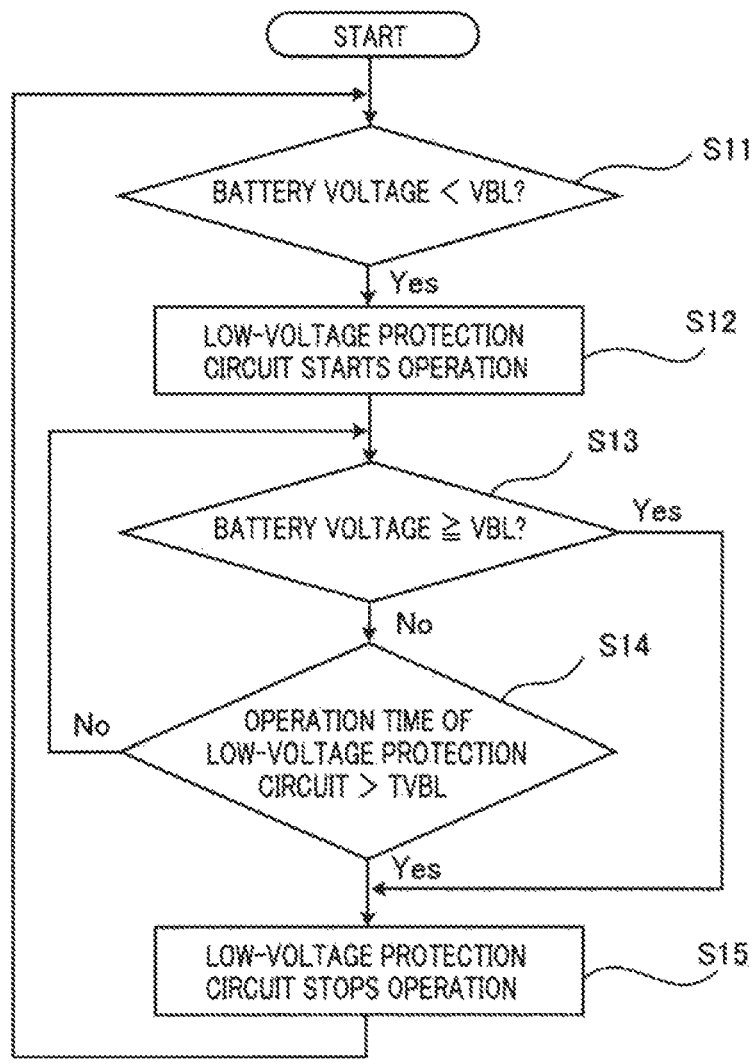
FIG. 2 is a flowchart for explaining the operation performed by the power generation controller for a vehicle AC power generator according to Embodiment 1.

FIG. 2 is a flowchart for explaining the operation performed by the power generation controller for a vehicle AC power generator according to Embodiment 1. The operation by the power generation controller for a vehicle AC power generator, which is represented by the flowchart in FIG. 2, is repeated in a predetermined period. In FIG. 2, in the step S11, the low-voltage protection circuit 102 compares the battery voltage, as the output voltage of the battery 17, with the predetermined voltage VBL; in the case where it is determined that the battery voltage is lower than the predetermined voltage VBL (Yes), the step S11 is followed by the step S12.

In the step S12, the low-voltage protection circuit 102 starts its operation and turns on the transistor 15, regardless of switching control of the transistor 15 by the voltage control circuit 101, so as to start the operation in which a field current is increased to raise the power-generation voltage of the AC power generator main body 100.

Next, in the step S13, the low-voltage protection circuit 102 compares the battery voltage with the predetermined voltage VBL; in the case where it is determined that the battery voltage is the same as or higher than the predetermined voltage VBL (Yes), the step S13 is followed by the step S15, where the low-voltage protection circuit 102 stops the foregoing operation. In contrast, in the case where it is determined in the step S13 that the battery voltage is not the same as or higher than the predetermined voltage VBL (No), the step S13 is followed by the step S14.

In the step S14, the low-voltage-protection continuous operation prevention circuit 103 compares the operation time of the low-voltage protection circuit 102 with the predetermined time TVBL; in the case where it is determined that the operation time of the low-voltage protection circuit 102 has not exceeded the predetermined time TVBL (No), the step S13 is resumed. In contrast, in the case where it is determined in the step S14 that the operation time of the low-voltage protection circuit 102 has exceeded the predetermined time TVBL (Yes), the step S14 is followed by the step S15, where the low-voltage-protection continuous operation prevention circuit 103 stops the low-voltage protection circuit 102 from performing the foregoing operation. As a result, the power generation controller 11 resumes the normal operation performed by the voltage control circuit 101.

As described above, in the power generation controller for an AC power generator according to Embodiment 1, when the low-voltage protection circuit 102 has continued the operation of raising the power-generation voltage of the AC power generator main body 100 for a time longer than a predetermined time, the low-voltage-protection continuous operation prevention circuit 103 detects the fact and then stops the low-voltage protection circuit 102 from operating; therefore, normal control of the power-generation voltage by the voltage control circuit 101 becomes effective and hence the power-generation voltage of the AC power generator main body 100 can be prevented from becoming an overvoltage.

In addition, it may be allowed that when measuring not the operation time of the low-voltage protection circuit 102 but the time in which the battery voltage is low and then detecting that the state where the battery voltage is low has continued for a time exceeding the predetermined time, the low-voltage-protection continuous operation prevention circuit 103 stops the low-voltage protection circuit 102 from operating.

Embodiment 2

Figure 3:
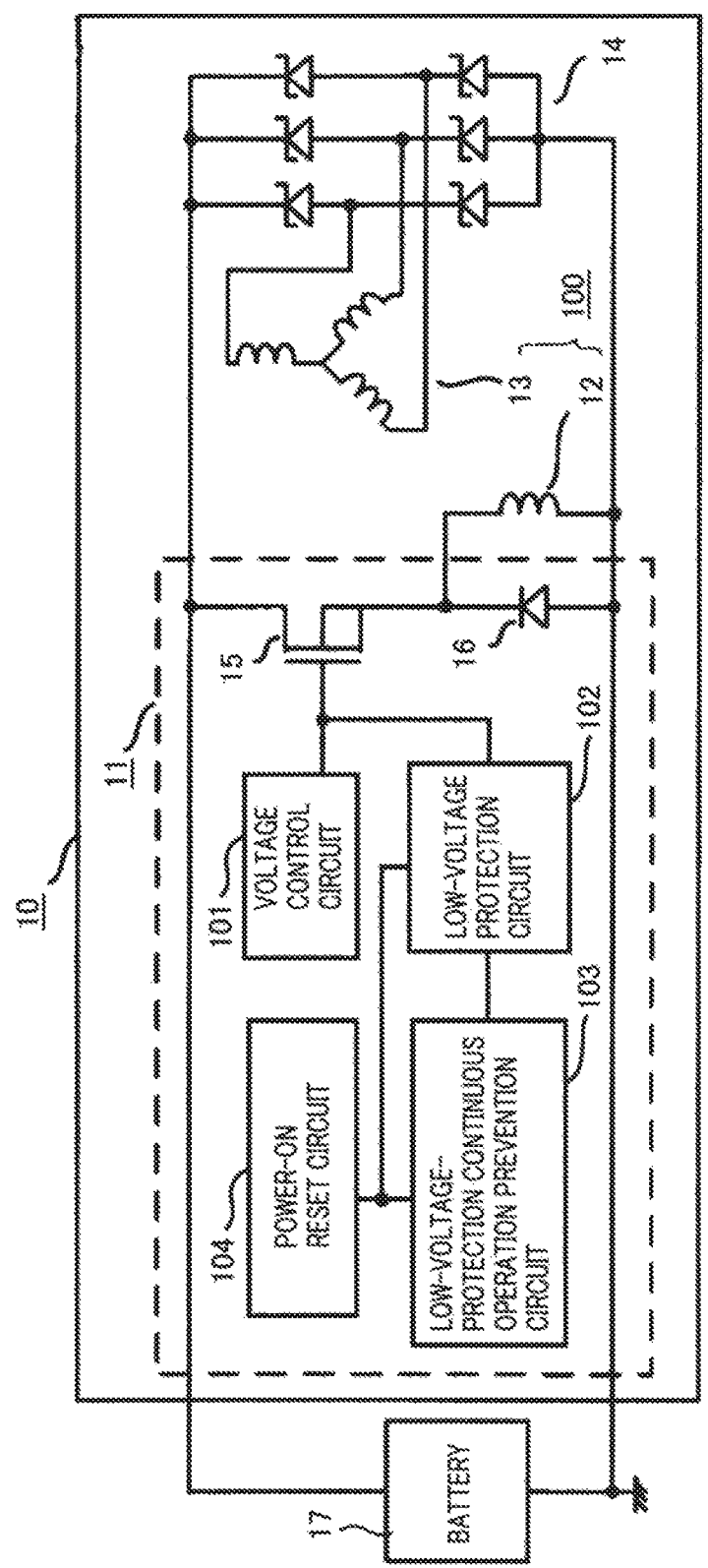
FIG. 3 is a configuration diagram representing a power generation controller for a vehicle AC power generator according to Embodiment 2.

Next, a power generation controller for a vehicle AC power generator according to Embodiment 2 will be explained. FIG. 3 is a configuration diagram representing a power generation controller for a vehicle AC power generator according to Embodiment 2. In FIG. 3, a power generation controller 11 includes the recirculation diode 16 connected in parallel with the field coil 12, the transistor 15 as a switching device, a power-on reset circuit 104, the voltage control circuit 101, the low-voltage protection circuit 102, and the low-voltage-protection continuous operation prevention circuit 103. As the example of hardware represented in FIG. 6, the power-on reset circuit 104 is formed of the processor 1001 and the storage device 1002.

The power-on reset circuit 104 detects a rise or a fall in the voltage of the internal power source (unillustrated) in the power generation controller 11 and then outputs a reset signal. When a rise in the voltage of the internal power source is detected, the reset signal from the power-on reset circuit 104 resets and enables the low-voltage protection circuit 102 and the low-voltage-protection continuous operation prevention circuit 103.

When detecting that the operation time of the low-voltage protection circuit 102 has continued for a time exceeding a predetermined time, the low-voltage-protection continuous operation prevention circuit 103 stops the low-voltage protection circuit 102 from operating; concurrently, the low-voltage protection circuit 102 and the low-voltage-protection continuous operation prevention circuit 103 are disabled. Accordingly, even in the case where after the low-voltage protection circuit 102 and the low-voltage-protection continuous operation prevention circuit 103 have been disabled, the power-generation voltage of the AC power generator main body 100, i.e., the battery voltage becomes again lower than a predetermined voltage, the low-voltage protection circuit 102 does not operate.

As described above, when a rise in the voltage of the internal power source is detected by the power-on reset circuit 104, the low-voltage protection circuit 102 and the low-voltage-protection continuous operation prevention circuit 103 are enabled. Accordingly, at the same time when the battery voltage, i.e., the power-generation voltage of the AC power generator main body 100 becomes lower than a predetermined voltage and the low-voltage protection circuit 102 starts the foregoing operation, the low-voltage-protection continuous operation prevention circuit 103 measures the operation time of the low-voltage protection circuit 102.

When the low-voltage-protection continuous operation prevention circuit 103 detects that the operation time of the low-voltage protection circuit 102 has continued for a time exceeding a predetermined time, the low-voltage protection circuit 102 and the low-voltage-protection continuous operation prevention circuit 103 are disabled; then, a transition to a normal operation by the voltage control circuit 101 is made. In this situation, because the low-voltage protection circuit 102 is disabled, the low-voltage protection circuit 102 does not operate, as described above, even when the battery voltage becomes again lower than the predetermined voltage VBL.

Also when detecting a fall in the voltage of the internal power source in the power generation controller 11, the power-on reset circuit 104 outputs the reset signal. Accordingly, when the internal power source becomes off for some reason, the low-voltage protection circuit 102 and the low-voltage-protection continuous operation prevention circuit 103 are reset by the reset signal from the power-on reset circuit 104.

Figure 4:
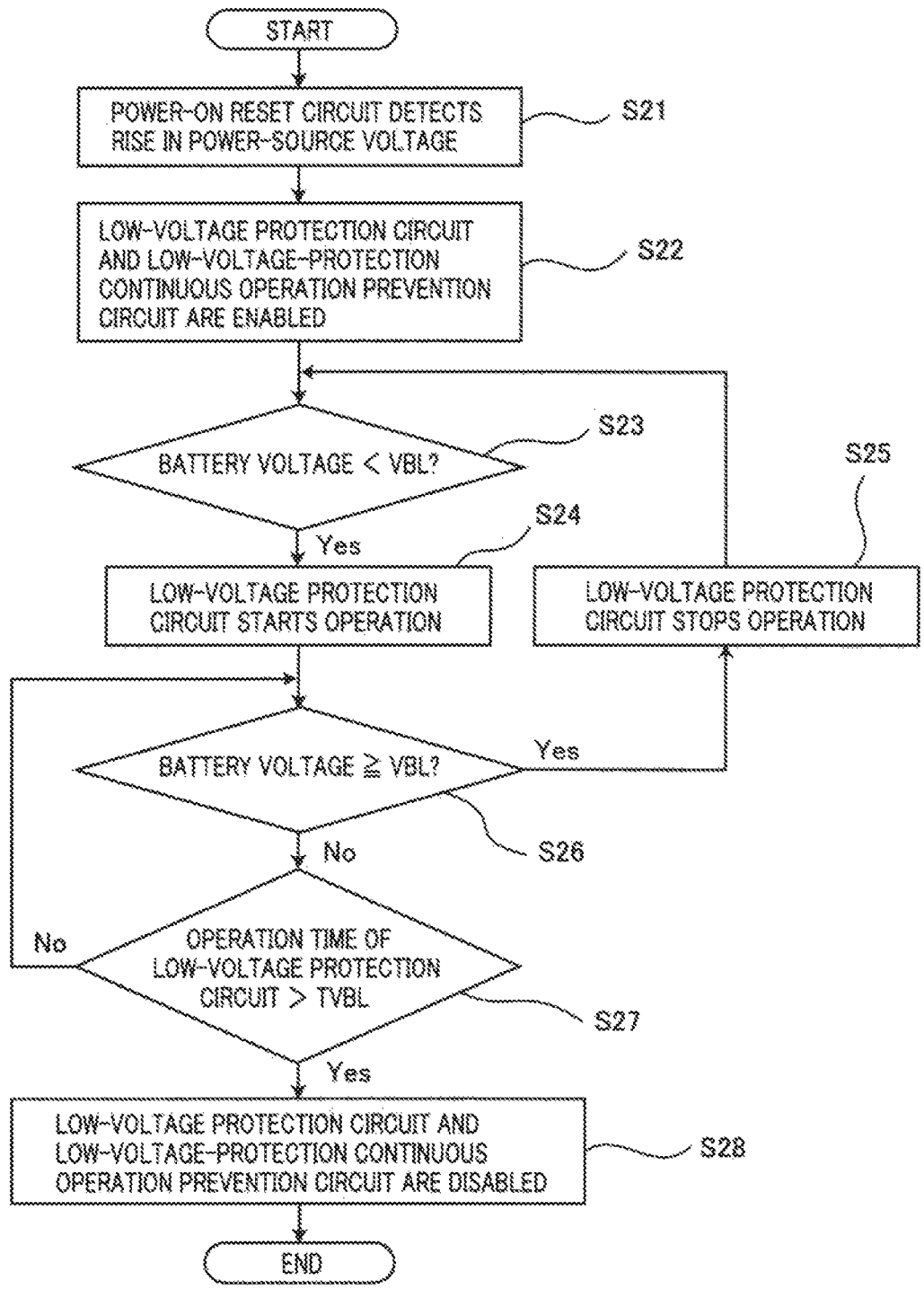
FIG. 4 is a flowchart representing the operation performed by the power generation controller for a vehicle AC power generator according to Embodiment 2.

FIG. 4 is a flowchart representing the operation performed by the power generation controller for a vehicle AC power generator according to Embodiment 2. In FIG. 4, in the step S21, when detecting a rise in the voltage of the internal power source in the power generation controller 11, the power-on reset circuit 104 outputs the reset signal. In the step S22, the low-voltage protection circuit 102 and the low-voltage-protection continuous operation prevention circuit 103 receive the reset signal from the power-on reset circuit 104 so as to be enabled.

Next, in the step S23, the low-voltage protection circuit 102 compares the battery voltage, as the output voltage of the battery 17, with the predetermined voltage VBL; in the case where it is determined that the battery voltage is lower than the predetermined voltage VBL (Yes), the step S23 is followed by the step S24.

In the step S24, the low-voltage protection circuit 102 starts its operation and turns on the transistor 15, regardless of switching control of the transistor 15 by the voltage control circuit 101, so as to start the operation in which a field current is increased to raise the power-generation voltage of the AC power generator main body 100.

Next, in the step S24, the low-voltage protection circuit 102 compares the battery voltage with the predetermined voltage VBL; in the case where it is determined that the battery voltage is the same as or higher than the predetermined voltage VBL (Yes), the step S24 is followed by the step S25, where the low-voltage protection circuit 102 stops the foregoing operation; then, the step S23 is resumed. In contrast, in the case where it is determined in the step S24 that the battery voltage is not the same as or higher than the predetermined voltage VBL (No), the step S24 is followed by the step S27.

In the step S27, the low-voltage-protection continuous operation prevention circuit 103 compares the operation time of the low-voltage protection circuit 102 with the predetermined time TVBL; in the case where it is determined that the operation time of the low-voltage protection circuit 102 has not exceeded the predetermined time TVBL (No), the step S26 is resumed. In contrast, in the case where it is determined in the step S27 that the operation time of the low-voltage protection circuit 102 has exceeded the predetermined time TVBL (Yes), the step S27 is followed by the step S28, where the low-voltage protection circuit 102 and the low-voltage-protection continuous operation prevention circuit 103 are disabled, so that the low-voltage protection circuit 102 is stopped from performing the foregoing operation. The low-voltage protection circuit 102 is disabled and stopped from operating in such a manner as described above; thus, the power generation controller 11 resumes the normal operation by the voltage control circuit 101.

In this situation, because being disabled in the step S28, the low-voltage protection circuit 102 does not operate, even when the battery voltage becomes again lower than the predetermined voltage VBL.

In the present embodiment, as a means for detecting that the power-generation voltage of the AC power generator main body 100 is lower than a predetermined voltage, it is detected, as described later, that the battery voltage is lower than a predetermined voltage VBL; however, it may be allowed that the power-generation voltage of the AC power generator main body 100 is directly detected and then it is detected that the power-generation voltage is lower than a predetermined voltage.

In Embodiment 2, when the low-voltage-protection continuous operation prevention circuit 103 once performs its operation, the low-voltage protection circuit 102 and the low-voltage-protection continuous operation prevention circuit 103 are disabled. The reason for this is that because when the low-voltage-protection continuous operation prevention circuit 103 operates, the probability of a state where there exists some sort of abnormality such as a failure in the circuit for detecting the battery voltage is high, it is not desirable that the low-voltage protection circuit 102 for forcibly raising the power-generation voltage is made to operate in the foregoing state.

In the case where even when the low-voltage protection circuit 102 operates for a time exceeding the predetermined time TVBL, the battery voltage, i.e., the power-generation voltage of the AC power generator main body 100 does not rise to a voltage exceeding a predetermined voltage, it is made possible to obtain a safe power generation controller, even when the low-voltage protection circuit is disabled.

In the foregoing power generation controller for a vehicle AC power generator according to Embodiment 2, when the low-voltage-protection continuous operation prevention circuit 103 once performs its operation, the low-voltage protection circuit 102 and the low-voltage-protection continuous operation prevention circuit 103 are disabled; therefore, even in the case where there exists some sort of abnormality such as a failure in the circuit for detecting the battery voltage, the low-voltage protection circuit 102 does not operate; thus, because the power-generation voltage is not forcibly raised, the power generation controller 11 can be made to safely operate.

The other configurations are the same as those in Embodiment 1. In addition, it may be allowed that when measuring not the operation time of the low-voltage protection circuit 102 but the time in which the battery voltage is low and then detecting that the state where the battery voltage is low has continued for a time exceeding the predetermined time, the low-voltage-protection continuous operation prevention circuit 103 stops the low-voltage protection circuit 102 from operating.

Embodiment 3

Figure 5:
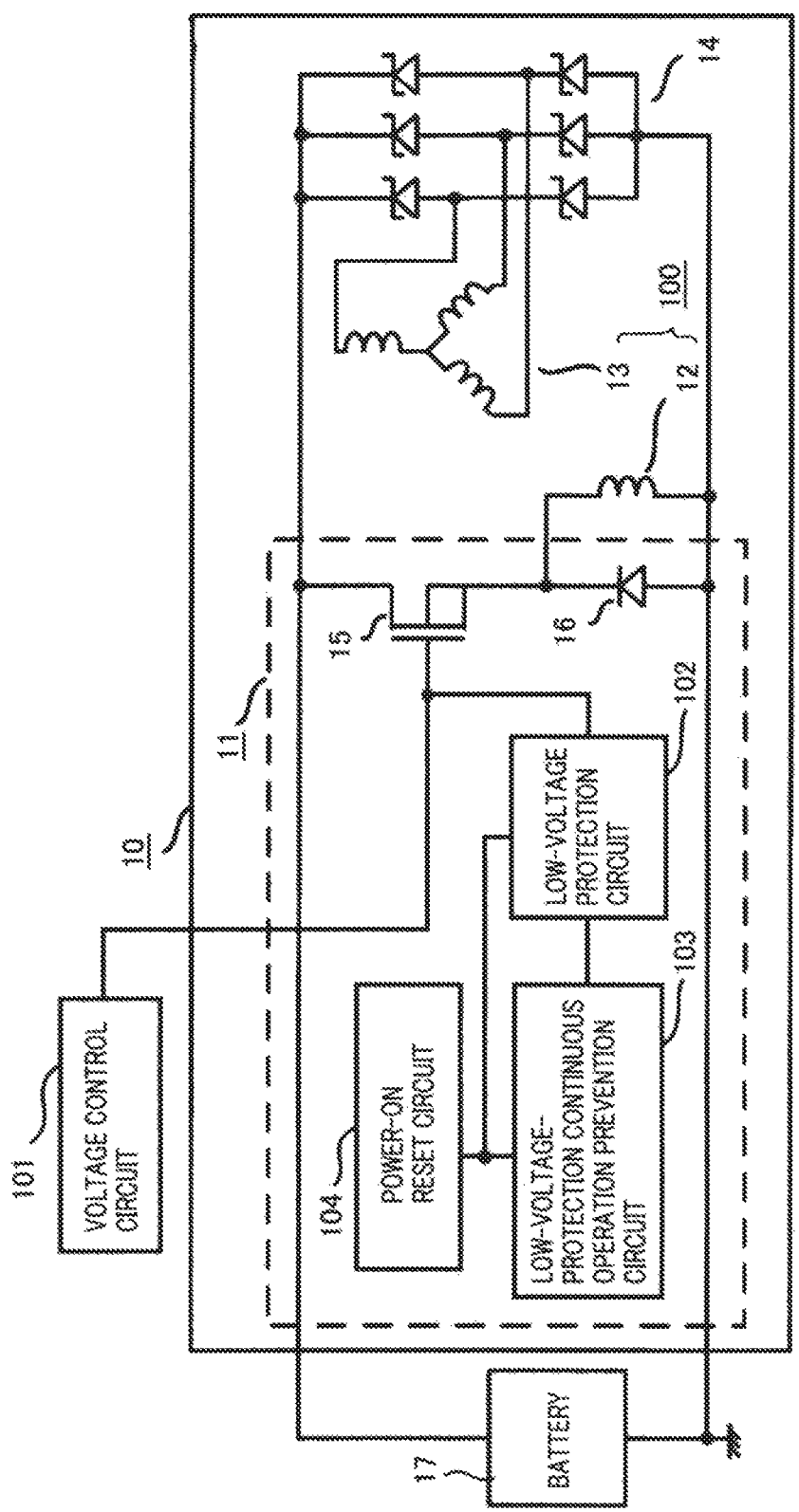
FIG. 5 is a configuration diagram representing a power generation controller for a vehicle AC power generator according to Embodiment 3.

Next, a power generation controller for a vehicle AC power generator according to Embodiment 3 will be explained. FIG. 5 is a configuration diagram representing a power generation controller for a vehicle AC power generator according to Embodiment 3. The power generation controller for a vehicle AC power generator according to Embodiment 3 is characterized in that the voltage control circuit 101 is provided outside the power generation controller 11, for example, in an ECU (Engine Control Unit). The other configurations are the same as those of the power generation controller for an AC power generator according to Embodiment 2.

In the power generation controller for an AC power generator according to Embodiment 3, power-generation control performed at the ECU side makes it possible to utilize information items such as the state of the engine, the state of the vehicle, and the like; thus, comfortable vehicle travel can be provided by finely controlling operation of a load on the vehicle AC power generator.

Moreover, even when the voltage control circuit is provided outside the power generation controller for a vehicle AC power generator, there may exist a case where an instantaneous voltage fall, caused by the lowpass filter for removing a ripple, cannot be coped with; however, the power generation controller for an AC power generator according to Embodiment 3 makes it possible to raise the voltage of the AC power generator main body by means of the low-voltage protection circuit and the low-voltage-protection continuous operation prevention circuit; thus, it is made possible to obtain a power generation controller that can perform safe and stable operation.

Embodiment 4

A power generation controller for a vehicle AC power generator according to Embodiment 4 is characterized in that in the power generation controller for a vehicle AC power generator according to each of Embodiments 1 through 3, the foregoing predetermined voltage VBL and the foregoing predetermined time TVBL can be set by an external control apparatus provided outside the power generation controller 11. The other configurations are the same as those of the power generation controller for a vehicle AC power generator according to Embodiment 1, the power generation controller for a vehicle AC power generator according to Embodiment 2, or the power generation controller for a vehicle AC power generator according to Embodiment 3. In this situation, it goes without saying that the external control apparatus that can set the predetermined voltage VBL and the predetermined time TVBL may be either the foregoing ECU or another control apparatus.

In the power generation controller for a vehicle AC power generator according to Embodiment 4, the predetermined voltage VBL and the predetermined time TVBL can be set by the external control apparatus provided outside the power generation controller; therefore, even when the target setting voltage for the power-generation voltage of the AC power generator main body 100 is changed, it is made possible that the predetermined voltage VBL and the predetermined time TVBL can readily be set in accordance with the target setting voltage for the power-generation voltage of the AC power generator main body 100, without changing anything about the low-voltage protection circuit 102 and the low-voltage-protection continuous operation prevention circuit 103.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, numberless unillustrated variant examples are conceivable within the scope of the technology disclosed in the present application. For example, at least one of the constituent components may be modified, added, or eliminated. At least one of the constituent components mentioned in at least one of the preferred embodiments may be selected and combined with the constituent components mentioned in another preferred embodiment.

INDUSTRIAL APPLICABILITY

A power generation controller for an AC power generator according to the present application can be applied to the field of an AC power generator to be mounted in a vehicle such as an automobile or the field of a vehicle such as an automobile.

DESCRIPTION OF REFERENCE NUMERALS

10: vehicle AC power generator
100: AC power generator main body
11: power generation controller
12: field coil
13: armature coil
14: rectifier
15: transistor
16: recirculation diode
17: battery
101: voltage control circuit
102: low-voltage protection circuit 103: low-voltage-protection continuous operation prevention circuit
104: power-on reset circuit
1001: processor
1002: storage device

The invention claimed is:

1. A power generation controller for a vehicle AC power generator, the power generation controller comprising:
a voltage control circuit that, by performing a first operation, controls generation of a power-generation voltage of an AC power generator main body by controlling a field current flowing in a field coil of the AC power generator main body to be mounted in a vehicle, wherein the first operation is an operation performed by the voltage control circuit and is for controlling the field current by performing a PWM switching operation of a transistor, which is connected to the field coil, based on a driving signal;
a low-voltage protection circuit that, based on detecting the power-generation voltage or a voltage based on the power-generation voltage being lower than a predetermined voltage, increases the field current so as to raise the power-generation voltage by performing a second operation, wherein the second operation is an operation performed by the low-voltage protection circuit and is for maintaining the transistor in an on state; and
a low-voltage-protection continuous operation prevention circuit that, based on determining that the second operation performed by the low-voltage protection circuit has continued for a time exceeding a predetermined time, stops the second operation of the low voltage protection circuit,
wherein, while the low-voltage protection circuit performs the second operation, the first operation of controlling the field current by performing the PWM switching operation of the transistor is stopped,
wherein, based on the second operation being stopped, the voltage control circuit resumes the first operation of controlling the field current by performing the PWM switching operation of the transistor based on the driving signal,
wherein the power generation controller further includes a reset circuit that, based on detecting a rise in an internal voltage, outputs a reset signal, and
wherein the low-voltage protection circuit and the low-voltage-protection continuous operation prevention circuit are enabled by the reset signal and are disabled when the low voltage-protection continuous operation prevention circuit stops the low-voltage protection circuit from operating.

2. The power generation controller for a vehicle AC power generator according to claim 1, further including:
an internal power source that supplies electric power to at least the voltage control circuit, the low-voltage protection circuit, and the low-voltage-protection continuous operation prevention circuit,
wherein the reset circuit that detects a rise in a voltage of the internal power source and then outputs the reset signal, and
and wherein after being disabled, the low-voltage protection circuit does not perform the second operation, even when the power-generation voltage or the voltage based on the power-generation voltage becomes lower than the predetermined voltage.

3. The power generation controller for a vehicle AC power generator according to claim 2, wherein the reset circuit further detects a fall in a voltage of the internal power source and then outputs the reset signal, and
wherein the low-voltage protection circuit and the low-voltage-protection continuous operation prevention circuit are reset by the reset signal that is outputted from the reset circuit when the reset circuit detects a fall in a voltage of the internal power source.

4. The power generation controller for a vehicle AC power generator according to claim 3, wherein the voltage control circuit controls the power-generation voltage based on a target setting voltage provided to the power generation controller.

5. The power generation controller for a vehicle AC power generator according to claim 4, wherein the predetermined voltage and the predetermined time are set by a control apparatus external to the power generation controller.

6. The power generation controller for a vehicle AC power generator according to claim 3, wherein the predetermined voltage and the predetermined time are set by a control apparatus external to the power generation controller.

7. The power generation controller for a vehicle AC power generator according to claim 2, wherein the voltage control circuit controls the power-generation voltage based on a target setting voltage provided to the power generation controller.

8. The power generation controller for a vehicle AC power generator according to claim 7, wherein the predetermined voltage and the predetermined time can be set by an external control apparatus.

9. The power generation controller for a vehicle AC power generator according to claim 2, wherein the predetermined voltage and the predetermined time are set by a control apparatus external to the power generation controller.

10. The power generation controller for a vehicle AC power generator according to claim 1, wherein the voltage control circuit controls the power-generation voltage based on a target setting voltage provided to the power generation controller.

11. The power generation controller for a vehicle AC power generator according to claim 10, wherein the predetermined voltage and the predetermined time are set by a control apparatus external to the power generation controller.

12. The power generation controller for a vehicle AC power generator according to claim 1, wherein the predetermined voltage and the predetermined time are set by a control apparatus external to the power generation controller.

13. A power generation controller for a vehicle AC power generator, the power generation controller comprising:
a voltage control circuit that controls a power-generation voltage of an AC power generator main body by controlling a field current flowing in a field coil of the AC power generator main body to be mounted in a vehicle;
a low-voltage protection circuit that performs an operation of increasing the field current so as to raise the power-generation voltage, when the power-generation voltage or a voltage based on the power-generation voltage becomes lower than a predetermined voltage;
a low-voltage-protection continuous operation prevention circuit that stops the low-voltage protection circuit from performing the operation, when the operation performed by the low-voltage protection circuit has continued for a time exceeding a predetermined time;

an internal power source that supplies electric power to at least the voltage control circuit, the low-voltage protection circuit, and the low-voltage-protection continuous operation prevention circuit; and a reset circuit that detects a rise in a voltage of the internal power source and then outputs a reset signal, wherein the low-voltage protection circuit and the low-voltage-protection continuous operation prevention circuit are enabled by the reset signal outputted from the reset circuit, and are disabled when the low-voltage-protection continuous operation prevention circuit stops the low-voltage protection circuit from operating, and wherein after being disabled, the low-voltage protection circuit does not perform the operation, even when the power-generation voltage or the voltage based on the power-generation voltage becomes lower than the predetermined voltage.

14. The power generation controller for a vehicle AC power generator according to claim 13, wherein the reset circuit further detects a fall in a voltage of the internal power source and then outputs the reset signal, and wherein the low-voltage protection circuit and the low-voltage-protection continuous operation prevention circuit are reset by the reset signal that is outputted from the reset circuit when the reset circuit detects a fall in a voltage of the internal power source.

15. The power generation controller for a vehicle AC power generator according to claim 14, wherein the voltage control circuit controls the power-generation voltage based on a target setting voltage provided to the power generation controller.

16. The power generation controller for a vehicle AC power generator according to claim 15, wherein the predetermined voltage and the predetermined time are set by a control apparatus external to the power generation controller.

17. The power generation controller for a vehicle AC power generator according to claim 14, wherein the predetermined voltage and the predetermined time are set by a control apparatus external to the power generation controller.

18. The power generation controller for a vehicle AC power generator according to claim 13, wherein the voltage control circuit controls the power-generation voltage based on a target setting voltage provided to the power generation controller.

19. The power generation controller for a vehicle AC power generator according to claim 18, wherein the predetermined voltage and the predetermined time are set by a control apparatus external to the power generation controller.

20. The power generation controller for a vehicle AC power generator according to claim 13, wherein the predetermined voltage and the predetermined time are set by a control apparatus external to the power generation controller.

* * * * *